United States Patent
Hawawini et al.

(10) Patent No.: US 9,641,080 B2
(45) Date of Patent: May 2, 2017

(54) MULTI-OUTPUT BOOST REGULATOR WITH SINGLE CONTROL LOOP

(71) Applicant: QUALCOMM Incorporated, San Diego, CA (US)

(72) Inventors: Shadi Hawawini, Mountain View, CA (US); Giovanni Garcea, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/923,758

(22) Filed: Oct. 27, 2015

(65) Prior Publication Data

US 2016/0049873 A1 Feb. 18, 2016

Related U.S. Application Data

(63) Continuation of application No. 14/024,383, filed on Sep. 11, 2013, now Pat. No. 9,203,309.

(51) Int. Cl.
*H02M 3/158* (2006.01)
*H02M 1/08* (2006.01)
*H02M 1/00* (2006.01)

(52) U.S. Cl.
CPC ........... *H02M 3/1582* (2013.01); *H02M 1/08* (2013.01); *H02M 3/158* (2013.01); *H02M 3/1588* (2013.01); *H02M 2001/009* (2013.01); *Y02B 70/1466* (2013.01)

(58) Field of Classification Search
CPC ............................... H02M 3/1582; H02M 1/08
See application file for complete search history.

(56) References Cited

U.S. PATENT DOCUMENTS

| | | | |
|---|---|---|---|
| 7,227,277 B2 | 6/2007 | Chapman et al. | |
| 7,564,704 B2 | 7/2009 | Rozsypal et al. | |
| 7,852,060 B2 | 12/2010 | Omet et al. | |
| 8,427,113 B2 | 4/2013 | Xing et al. | |
| 2007/0159150 A1* | 7/2007 | Hosokawa | H02M 3/1588 323/285 |
| 2008/0238383 A1 | 10/2008 | Watanabe et al. | |
| 2009/0103341 A1 | 4/2009 | Lee et al. | |
| 2010/0148587 A1 | 6/2010 | Khaligh | |
| 2010/0308654 A1 | 12/2010 | Chen | |
| 2012/0212987 A1 | 8/2012 | Weir et al. | |
| 2013/0003423 A1 | 1/2013 | Song et al. | |
| 2015/0069983 A1 | 3/2015 | Hawawini et al. | |

OTHER PUBLICATIONS

Huang M.H., et al., "Single-Inductor Multi-Output (SIMO) DC-DC Converters with High Light-Load Efficiency and Minimized Cross-Regulation for Portable Devices," IEEE Journal of Solid-State Circuits, 2009, vol. 44 (4), pp. 1099-1111.
International Search Report and Written Opinion—PCT/US2014/055181—ISA/EPO—Dec. 2, 2014.

* cited by examiner

*Primary Examiner* — Emily P Pham
(74) *Attorney, Agent, or Firm* — Haynes and Boone, LLP

(57) ABSTRACT

A circuit may include a switching signal generator to generate a high-side switching signal and a low-side switching signal. A low-side switch may be connected to the output of the circuit and to the switching signal generator to receive the low-side switching signal. A plurality of high-side switches may be connected to corresponding inputs of the circuit. A matrix may be configured to selectively connect the high-side switching signal to two or more of the high-side switches.

20 Claims, 5 Drawing Sheets

MULTI-OUTPUT BOOST REGULATOR WITH SINGLE CONTROL LOOP

CROSS REFERENCE TO RELATED APPLICATIONS

This application is a continuation application and, pursuant to 35 U.S.C. §120, is entitled to and claims the benefit of earlier filed application U.S. application Ser. No. 14/024,383 filed Sep. 11, 2013, the content of which is incorporated herein by reference in its entirety for all purposes.

BACKGROUND

Unless otherwise indicated herein, the approaches described in this section are not prior art to the claims in this application and are not admitted to be prior art by inclusion in this section.

Modern electronic systems typically require some form of power conversion. The popularity of portable equipment (e.g., smartphones, portable computers, etc.) has driven the technology and the requirement for converting power efficiently. DC-DC converters called switching regulators (often referred to simply as "switchers") are especially suitable for use in portable electronic devices, and can either step-up (boost) or step-down (buck) DC electrical power.

Switching regulators used in portable electronic devices include a class of switching regulators called "buck-boost" switching regulators. The kind of buck-boost switchers used in portable electronic devices typically operate in forward buck mode and in reverse boost mode. In forward buck mode, a voltage at an input port is bucked to produce a regulated voltage at an output port. In reverse boost mode, a voltage at the output port is boosted to produce a regulated voltage at the input port.

SUMMARY

In accordance with some aspects of the present disclosure, a circuit may include a switching signal generator configured to generate a high-side switching signal and a low-side switching signal. A low-side switch may be connected to the output of the circuit and to the switching signal generator to receive the low-side switching signal. A plurality of high-side switches may be connected to respective inputs of the circuit. A matrix may be configured to selectively connect the high-side switching signal from the switching signal generator to two or more of the high-side switches.

In accordance with other aspects of the present disclosure, a method in a circuit may include generating a high-side drive signal and a low-side drive signal. A regulated voltage may be generated at two or more first terminals of the circuit from a voltage at a second terminal of the circuit using the high-side drive signal and the low-side drive signal, including driving a low-side switch connected to the second terminal of the circuit with the low-side drive signal and selectively driving two or more high-side switches connected to the two or more first terminals with the high-side drive signal.

In accordance with still other aspects of the present disclosure, a circuit may include means for generating a high-side drive signal and a low-side drive signal and means for generating a regulated voltage from a voltage provided to the circuit using the high-side drive signal and the low-side drive signal. The means for generating may include a low-side switch connected to the second terminal of the circuit and configured to be driven by the low-side drive signal, and means for selectively driving two or more high-side switches connected to the two or more first terminals with the high-side drive signal.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
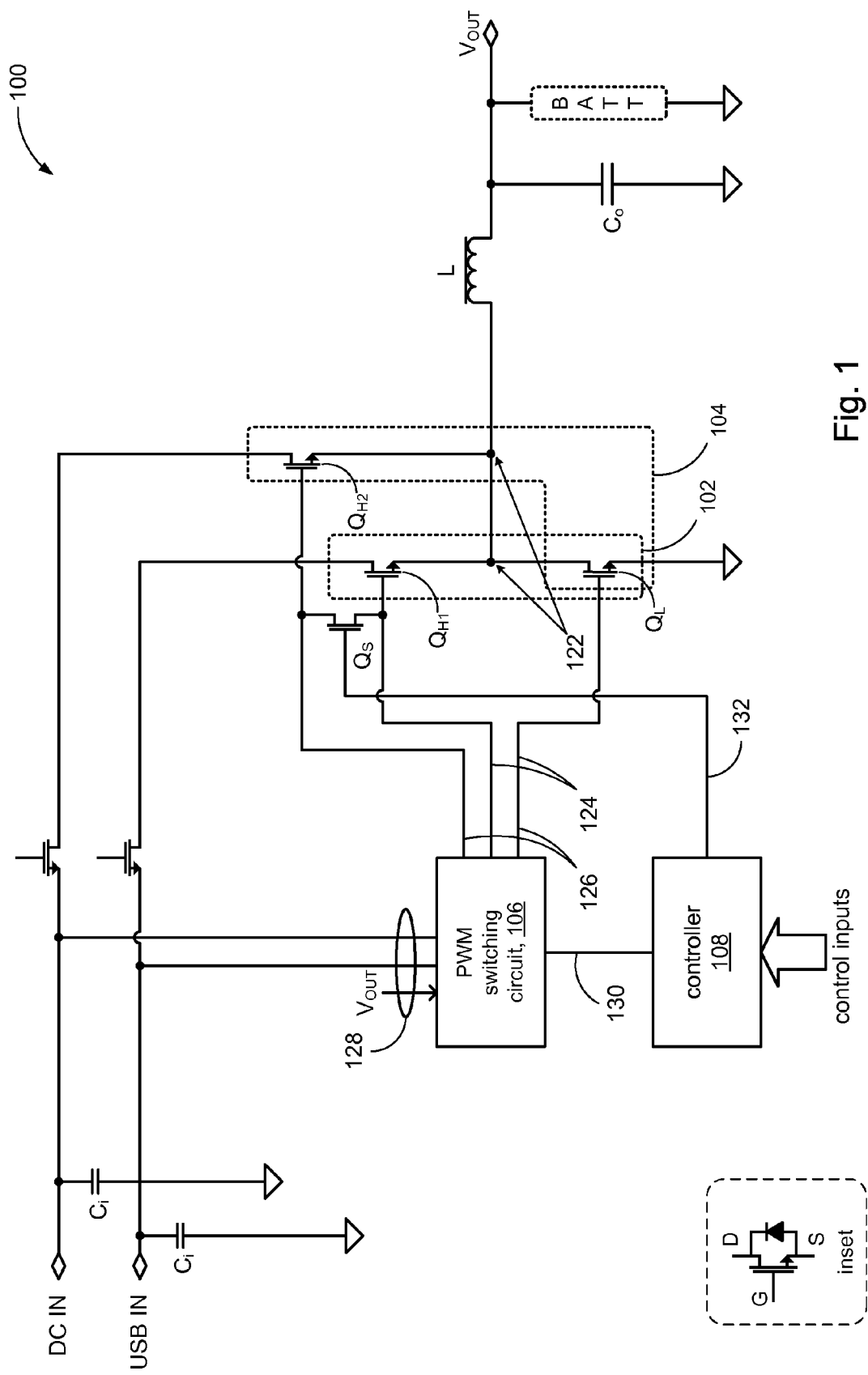
FIG. 1 shows a high level circuit diagram of a switching regulator in accordance with the present disclosure.

FIG. 1 shows a buck-boost switching regulator ("circuit") 100 in accordance with the present disclosure. One of ordinary skill will appreciate from the discussion to follow that the principles set forth herein can be incorporated in a boost-only switching regulator (not shown) as well, where the switching regulator can be operated in forward boost mode or in reverse boost mode.

In some embodiments, the circuit 100 illustrated in FIG. 1 may include several input ports. In an embodiment, for example, the input ports may include DC IN and USB IN. The USB IN port may be provided for connection to a USB compliant device. The DC IN port may be provided for connection to a power supply, or some other external device.

The circuit 100 may include half-bridge circuits 102 and 104, each being connected to an inductor L at a mid-point 122 between each half-bridge circuit 102, 104. In an embodiment, the USB IN port may feed into the half-bridge circuit 102, and the DC IN port may feed into the half-bridge circuit 104.

A system output $V_{OUT}$ may be obtained from the mid-point 122. In some embodiments, the circuit 100 may include a capacitor $C_O$ that is connected to system output $V_{OUT}$. The circuit 100 may be used in a portable electronic device (not shown) to provide power supplied at an input port USB IN or DC IN to system electronics comprising the portable electronic device via system output $V_{OUT}$. In a particular use case, the system electronics may be powered by a battery BATT and the battery is charged by the circuit 100.

The half-bridge circuit 102 may comprise a high side switch $Q_{H1}$ and a low side switch $Q_L$. The half-bridge circuit 104 similarly comprise a high side switch $Q_{H2}$ and low side switch $Q_L$. In some embodiments, such as shown in FIG. 1 for example, the half-bridge circuits 102, 104 may share the same low side switch, namely $Q_L$. In other embodiments, the half-bridge circuits 102, 104 may have their own respective low side switches (not shown). In some embodiments, the devices $Q_L$, $Q_{H1}$, and $Q_{H2}$ are power FETs.

The circuit 100 may include a PWM switching circuit 106 that can be operated to generate pulse-width modulated gate drive signals 124 to drive half-bridge circuit 102, or to generate gate drive signals 126 to drive half-bridge circuit 104. In particular, the drive signals 124, 126 drive the gates of power FETs $Q_L$, $Q_{H1}$, and $Q_{H2}$. The PWM switching circuit 106 may generate an internal error signal to control the duty cycles of the drive signals 124, 126. In some embodiments, feedback 128 may be provided from the system output $V_{OUT}$ or the input voltages at the DC IN and USB IN ports. In accordance with the present disclosure, the PWM switching circuit 106 may include a selector circuit to select system output $V_{OUT}$ as feedback 128 when operating in forward buck mode, and for reverse boost mode the selector circuit may select either the voltage at the USB IN port or the DC IN port as the feedback. The PWM switching circuit 106 may compare the selected feedback 128 against a reference voltage (e.g., a 5V reference, not shown) to generate the internal error signal. In some embodiments, the PWM switching circuit 106 may include several reference voltages to select from.

In accordance with the present disclosure, a shorting switch $Q_S$ may be connected across the gates of high side switch $Q_{H1}$ and high side switch $Q_{H2}$. In some embodiments, the shorting switch $Q_S$ may be a non-power switching FET.

A controller 108 may generate control signals 130 to control operation of the PWM switching circuit 106, for example, to operate in forward buck mode or reverse boost mode and to select a suitable feedback 128. In accordance with the present disclosure, the controller 108 may generate control signal 132 to operate the shorting switch $Q_S$ in the ON state or the OFF state. The control signals 130 and 132 may be generated according to control inputs that feed into the controller 108. In some embodiments, for example, the control inputs may be bits in a control register (not shown) that can be written to. It will be appreciated that the controller 108 may be implemented in any of several ways, including the use of digital logic circuits (e.g., application specific IC-ASIC), firmware, a combination of digital logic and firmware, and so on.

Forward buck mode operation and reverse boost mode operation will now be discussed. The circuit 100 may operate in "forward buck" mode, where an input voltage at USB IN or DCN IN is bucked to a lower voltage level and provided as a regulated voltage level at the system output $V_{OUT}$.

Figure 2B:
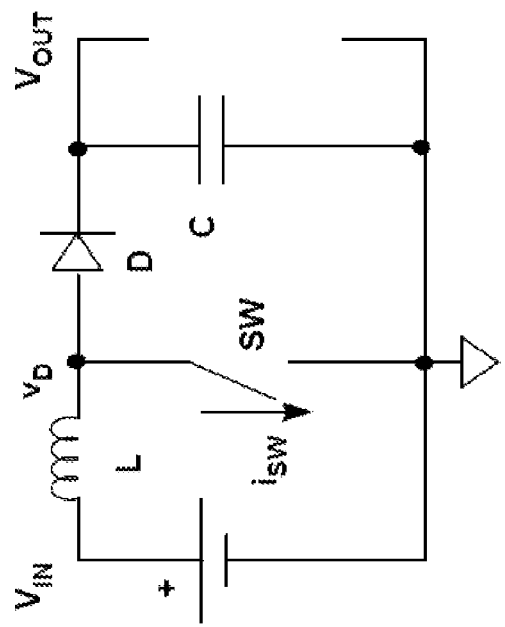
FIGS. 2A and 2B illustrate conventional buck converter and boost converter circuits, respectively.
Figure 2A:
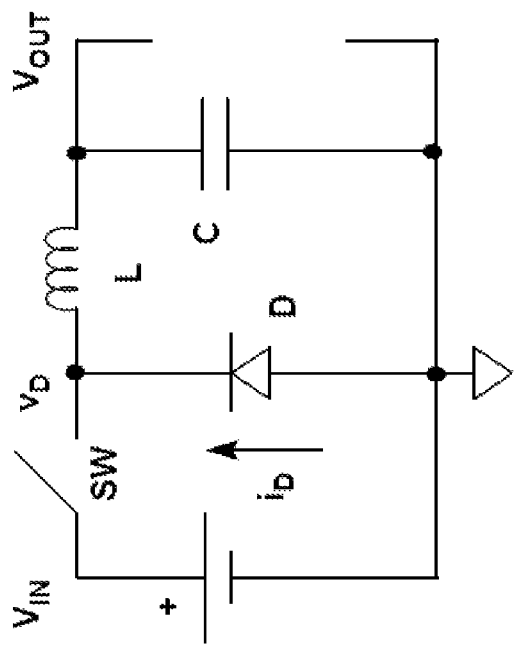

Consider, for example, buck mode operation on an input voltage provided at the DC IN port. The shorting switch $Q_S$ is in the OFF (non-conducting) state, and the PWM switching circuit 106 is operated to produce drive signals 126 to drive the high side and low side FETs $Q_{H2}$, and $Q_L$ (half-bridge 104) to operate as a buck regulator. Referring for a moment to FIG. 2A, the figure shows a conventional buck converter configuration. The input voltage $V_{IN}$ in FIG. 2A corresponds to the voltage at the DC IN port. The drive signals 126 may comprise pulse width modulated pulses that operate the power FETs $Q_{H2}$ and $Q_L$ so that $Q_{H2}$ is ON when $Q_L$ is OFF, and vice versa. One of skill in the art will recognize that the ON-OFF switching of the high side FET $Q_{H2}$ constitutes the switching element (SW) of the conventional buck converter shown in FIG. 2A. The low side FET $Q_L$ functions as the diode element (D) because it behaves as a forward conducting diode in the ON state and acts as a blocking diode in the OFF state by virtue of the device's body diode (see inset, FIG. 1). The system output $V_{OUT}$ corresponds to $V_{OUT}$ in FIG. 2A. The circuit 100 may be similarly operated for buck mode operation on an input voltage provided at the USB IN port.

The circuit 100 may operate in a conventional "reverse boost" mode, where a voltage level at the system output $V_{OUT}$ serves as the voltage that is boosted and provided at a higher regulated voltage level at one of the ports USB IN or DC IN. For example, in an on-the-go (OTG) operating mode, the battery BATT may serve as the power supply to provide power to a load (e.g., thumb drive) that is connected to the USB IN port.

Consider reverse boost mode operation on the USB IN port. The circuit 100 may be operated to boost a voltage provided at the system output $V_{OUT}$ (e.g., from battery BATT) to provide a regulated output voltage at the USB IN port. Accordingly, the PWM switching circuit 106 may be operated to produce drive signals 124 to drive the high side and low side FETs $Q_{H1}$, and $Q_L$ (half-bridge 102) to operate as a boost regulator. Referring for a moment to FIG. 2B, the figure shows a conventional boost converter configuration. In reverse boost mode operation, the voltage (e.g., from battery BATT) provided at system output $V_{OUT}$ corresponds to the input voltage $V_{IN}$ shown in FIG. 2B. The drive signals 126 may comprise pulse width modulated pulses that operate the power FETs $Q_{H1}$ and $Q_L$ so that $Q_{H1}$ is ON when $Q_L$ is OFF, and vice versa. One of skill will appreciate that the low side FET $Q_L$ constitutes the switching element (SW) of the conventional boost converter shown in FIG. 2B. The high side FET $Q_{H1}$ functions as the diode element (D) because it behaves as a forward conducting diode in the ON state and acts as a blocking diode in the OFF state by virtue of the device's body diode (see inset, FIG. 1). The PWM switching circuit 106 may use the output voltage generated at the USB IN port as feedback 128 to regulate the duty cycles of the drive signals 124. In reverse boost mode operation, the regulated output voltage produced at the USB IN port corresponds to $V_{OUT\_T}$ in FIG. 2B.

It will be appreciated that drive signals 126 may be similarly produced to provide reverse boost mode operation on the DC IN port. In particular, the low side FET $Q_L$ constitutes the switching element SW and the high side FET $Q_{H2}$ functions as the diode element D shown in FIG. 2B to produce a regulated output voltage at the DC IN port.

In the foregoing description of reverse boost mode operation, the $Q_S$ shorting switch is assumed to be in the OFF (non-conducting) state. Accordingly, an output voltage is produced at only the USB IN port or the DC IN port, depending on whether the PWM switching circuit 106 generates drive signals 124 or drive signals 126. However, in accordance with the present disclosure, the circuit 100 may operate in reverse boost mode in which the shorting switch $Q_S$ is in the ON state. For example, in some embodiments the controller 108 may assert a voltage level on control signal 132 to turn ON the shorting switch $Q_S$.

When the shorting switch $Q_S$ is in the ON (conducting) state during reverse boost mode, it can be appreciated that driving either of the half-bridges 102 (or 104) will also drive the other half-bridge 104 (or 102). For example, if the PWM switching circuit 106 generates drive signals 124 to drive $Q_{H1}$ and $Q_L$ (half-bridge 102), then $Q_{H2}$ will also be driven by virtue of the short between the gates of $Q_{H1}$ and $Q_{H2}$ that is provided by the shorting switch $Q_S$. And since $Q_L$ is common to half-bridges 102 and 104, the result is that both half-bridges are driven by drive signals 124. In other words, reverse boost occurs on both the USB IN port and the DC IN port, and a regulated output voltage is generated at both the USB IN port and the DC IN port.

Similarly if the PWM switching circuit 106 generates drive signals 126 to drive $Q_{H2}$ and $Q_L$ (half-bridge 104) with the $Q_S$ shorting switch ON, then $Q_{H1}$ will also be driven by virtue of the short between the gates of $Q_{H1}$ and $Q_{H2}$ that is provided by the shorting switch. And since $Q_L$ is common to half-bridges 102 and 104, both half-bridges are driven by drive signals 126 with the result that regulated output voltages are generated at both the DC IN port and the USB IN port.

The controller 108 may generate suitable control signals 130, 132 to control the nature of the reverse boost operation performed by the circuit 100. For example, the control inputs (e.g., from a control register) may inform the controller 108 to configure circuit 100 for reverse boost operation to provide a regulated output voltage on a specified one of the input ports USB IN or DC IN. Accordingly, control signal 132 will be de-asserted to turn OFF the shorting switch $Q_S$, and control signals 130 will be generated to control the PWM switching circuit 106 to generate drive signals 124 or 126 corresponding to the specified input port.

In accordance with the present disclosure, the control inputs may inform the controller 108 enable reverse boost operation on both input ports USB IN and DC IN to provide a regulated output voltage on both ports. Accordingly, control signal 132 will be asserted to turn ON the shorting switch $Q_S$. Since the gates of the high side FETs of each half-bridge are shorted together by the shorting switch $Q_S$, the PWM switching circuit 106 may assert either drive signals 124 or drive signals 126.

In accordance with the present disclosure, the control inputs may specify which input port has "priority" when reverse boost operation is enabled for both ports. The priority port refers to the port (e.g., USB IN or DC IN) whose output voltage will be regulated; e.g., by using the output voltage on the priority port as feedback 128 that the PWM switching circuit 106 will use to generate drive signals 124 or 126. The output voltage at the non-priority port will therefore be regulated according to the voltage on the priority port. In a particular implementation, for example, the PWM switching circuit 106 may include a selector to select a voltage on the USB IN port or the DC IN port as the feedback 128 to be compared against a reference voltage.

In accordance with the present disclosure, the operating mode of the circuit 100 can change dynamically by altering the control inputs. For example, suppose the circuit 100 is operating to provide reverse boost mode on the USB IN port only (i.e., a regulated output voltage is provided only to the USB IN port). The control inputs can be subsequently changed to configure the circuit 100 to enable reverse boost on both the USB IN and the DC IN ports; e.g., by the controller 108 asserting the control signal 132 to turn ON the shorting switch $Q_S$. Furthermore, the control inputs may identify the priority port to cause the controller 108 to generate suitable control signals 130 to the PWM switching circuit 106 to select the appropriate feedback 128; i.e., either the voltage on USB IN or the voltage on DC IN.

Conversely, suppose the circuit 100 is operating to provide reverse boost mode on both the USB IN and DC IN ports. The control inputs can be subsequently changed to configure the circuit 100 to enable reverse boost on only one of the input ports. In response, the controller 108 may de-assert control signal 132 to turn OFF the shorting switch $Q_S$ and assert control signals 130 to control the PWM switching circuit 106 to generate drive signals (124 or 126) to drive only the half-bridge corresponding to the specified input port, including selecting the proper feedback 128.

Figure 3:
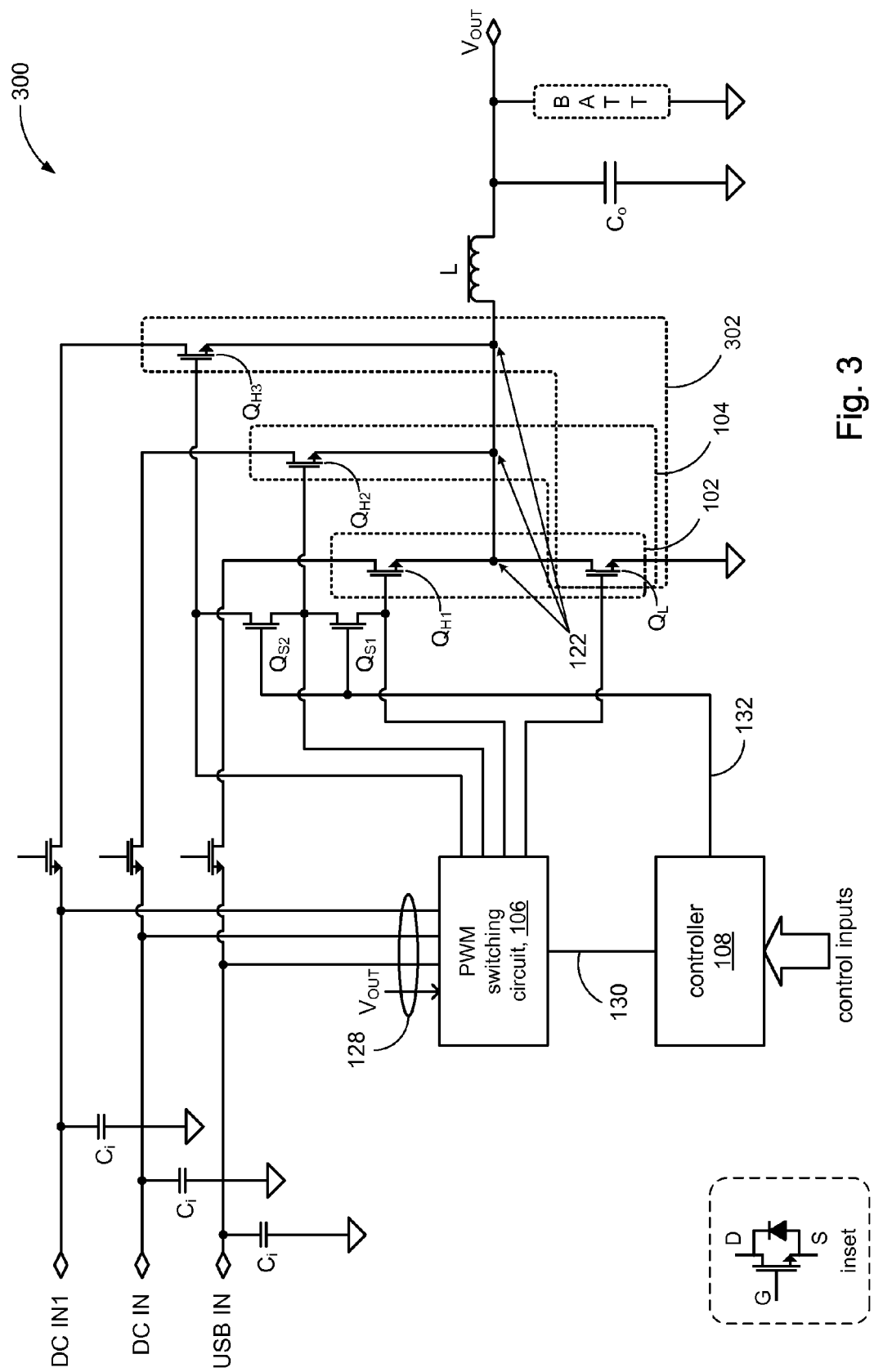
FIG. 3 illustrates an embodiment in accordance with the present disclosure having an additional input port.

In some embodiments, the circuit 100 may include additional input ports. Referring to FIG. 3, a circuit 300 includes an additional input port DC IN1. It will be appreciated that, in other embodiments, the number of additional input ports can be readily scaled to provide the circuit 300 with more than three input ports. The circuit 300 may include a half-bridge 302 connected to the DC IN1 port and to the mid-point 122. Shorting switches $Q_{S1}$ and $Q_{S2}$ may be provided to short the gates of high FETs $Q_{H1}$, $Q_{H2}$, and $Q_{H3}$. The control signal 132 can be used to turn ON both the $Q_{S1}$ and $Q_{S2}$ shorting switches, in the manner discussed above, in order to drive all three input ports with a regulated output voltage in accordance with the present disclosure.

Figure 4:
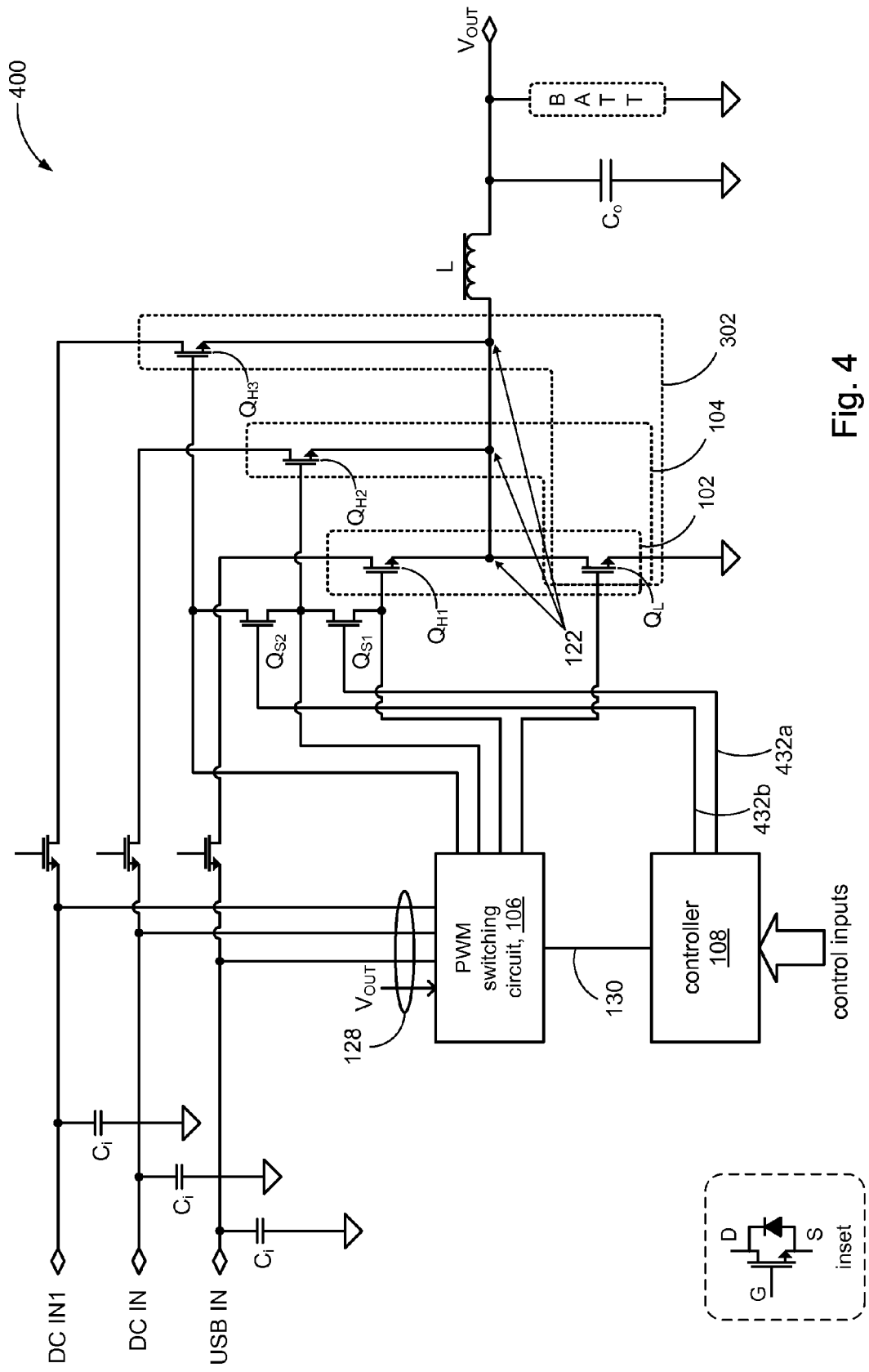
FIG. 4 illustrates an alternative embodiment of FIG. 3.

In some embodiments, additional circuitry and/or controls may be provided so that reverse boost mode operation is enabled on pairs of input ports. Referring to FIG. 4, for example, in an embodiment, the controller 108 may provide control signals 432a and 432b to specify the input ports that reverse boost mode operation is enabled for. For example, if both control signals 432a and 432b are asserted, then reverse boost mode is enabled for all three input ports. If only control signal 432a is asserted, then reverse boost mode is enabled for input ports USB IN and DC IN, but not DC IN1. If only control signal 432b is asserted, then reverse boost mode is enabled for input ports DC IN and DC IN1, but not USB IN.

Figure 5:
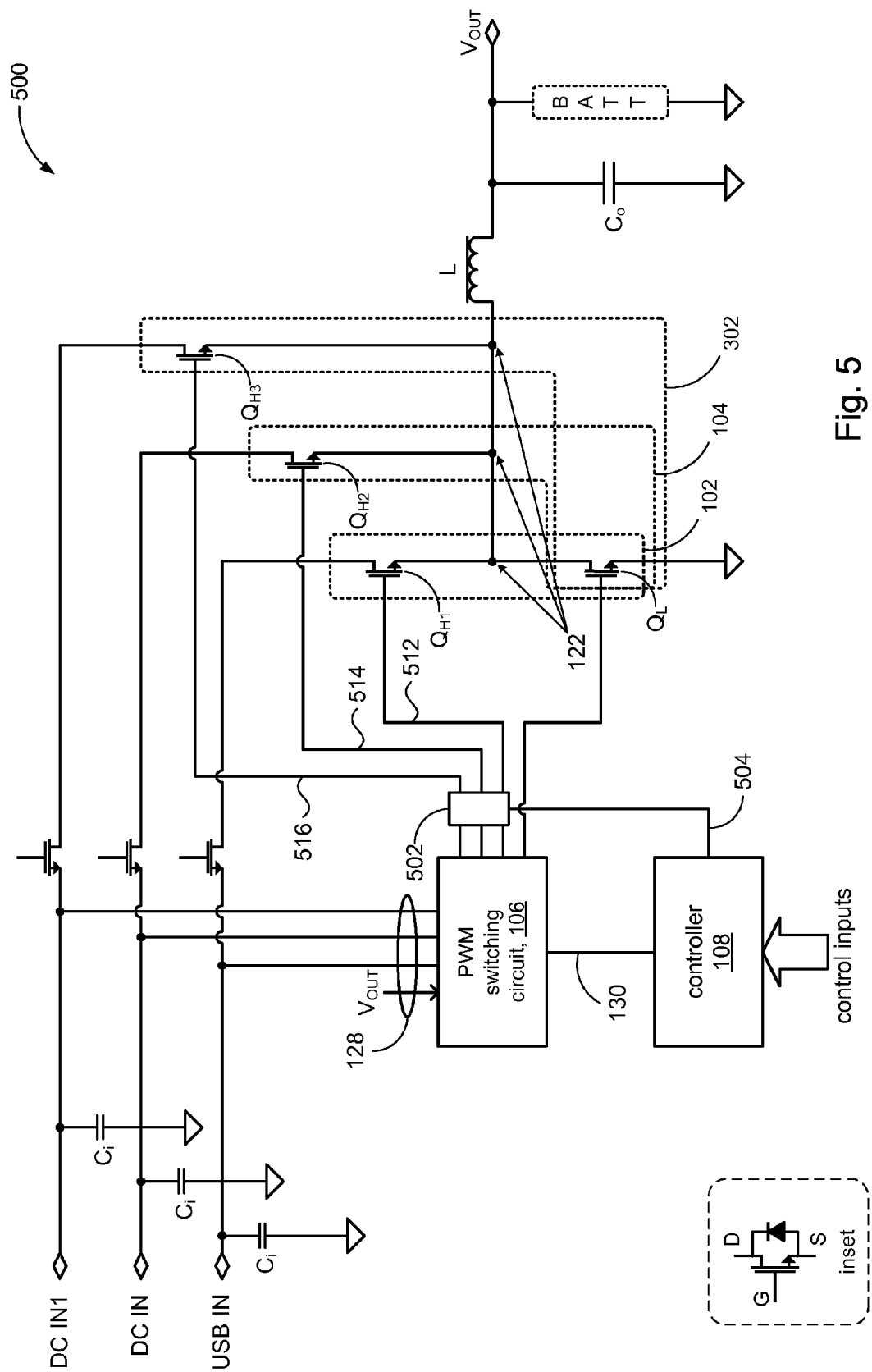
FIG. 5 illustrates an additional alternative embodiment of FIG. 3.

Referring to FIG. 5, in some embodiments, the shorting switches QS1 and QS2 may be replaced with a shorting matrix 502. The shorting matrix 502 may comprise a an array of switches that can be configured to short together any two of the high side drive signal lines 512, 514, 516, or all three of the lines. For example, lines 512 and 514 may be shorted together so that a regulated output voltage can be generated at the USB IN and DC IN ports, lines 512 and 516 may be shorted together so that a regulated output voltage can be generated at the USB IN and DC IN1 ports, and so on. The controller 108 may generate suitable control signals 504 to control the shorting matrix 502.

Advantages and Technical Effect

Advantages of switching regulators in accordance with the present disclosure over prior art regulators include significant reductions in chip real estate and chip cost.

Providing additional power rails at the input side of a prior art boost regulator operating in reverse boost mode typically requires "tapping" off of one or more of the input ports with multiple switches that use power FETs. Power FETs are typically physically large devices as compared to switching FETs and thus consume significant additional chip real estate. The switches need to be isolated from each other and from the input port being tapped. The additional isolation circuits increase the overall complexity of the design of a conventional regulator.

By comparison, switching regulators in accordance with the present disclosure (e.g., buck-boost regulator 100), can avoid the costly additional circuitry by "re-using" existing power FETs in the manner explained above. By adding only a small switching FET such as the shorting switch $Q_S$ (FIG. 1) and some additional control logic in the controller 108, an additional power rail for reverse boost mode can be realized with no significant increase in the size and complexity of the chip and virtually no increase in manufacturing cost.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by

We claim the following:

1. A circuit comprising:
   a plurality of inputs;
   an output;
   a switching signal generator configured to generate a high-side switching signal and a low-side switching signal;
   a low-side switch electrically connected to the output of the circuit and electrically connected to the switching signal generator to receive the low-side switching signal;
   a plurality of high-side switches forming a corresponding plurality of half-bridge circuits in relation to the low-side switch, each of the plurality of high-side switches connected to one of the plurality of inputs of the circuit; and
   a matrix configured to selectively electrically connect the high-side switching signal from the switching signal generator to two or more of the plurality of high-side switches.

2. The circuit of claim 1, further comprising an inductor connected to the plurality of high-side switches and the low-side switch.

3. The circuit of claim 1, wherein the switching signal generator is configured to generate first high-side and low-side switching signals for buck mode operation and to generate second high-side and low-side switching signals for boost mode operation.

4. The circuit of claim 1 configured to operate in buck mode, wherein a voltage at one of the plurality of inputs of the circuit is bucked to generate a regulated voltage at the output of the circuit.

5. The circuit of claim 1 configured to operate in boost mode, wherein a voltage at the output of the circuit is boosted to generate a regulated voltage at two or more inputs of the circuit corresponding to the two or more high-side switches.

6. The circuit of claim 5, wherein for boost mode operation, one of the plurality of inputs of the circuit corresponding to the two or more high-side switches is used in a feedback loop.

7. The circuit of claim 1, further comprising a capacitor connected to the output of the circuit.

8. The circuit of claim 1, wherein the circuit is a buck-boost switching regulator.

9. A method in a circuit comprising:
   generating a high-side drive signal and a low-side drive signal; and
   generating a regulated voltage at two or more first terminals of the circuit from a voltage at a second terminal of the circuit using the high-side drive signal and the low-side drive signal, including:
   driving a low-side switch connected to the second terminal of the circuit with the low-side drive signal; and
   selectively driving two or more high-side switches connected to the two or more first terminals with the high-side drive signal, the two or more high side switches each forming a half-bridge circuit in relation to the low-side switch.

10. The method of claim 9, further including selecting the two or more high-side switches from among a plurality of high-side switches.

11. The method of claim 10, wherein each of the plurality of high-side switches is connected to a corresponding first input of the circuit.

12. The method of claim 9, wherein selectively driving two or more high-side switches with the high-side drive signal includes electrically shorting together gate terminals of the two or more high-side switches.

13. The method of claim 9, further comprising using a voltage level at one of the two or more first terminals of the circuit as a feedback signal to regulate the regulated voltage generated at the two or more first terminals.

14. The method of claim 9, wherein the circuit is operated in a reverse boost mode to generate a regulated voltage at two or more first terminals of the circuit from a voltage at a second terminal of the circuit.

15. The method of claim 9, further comprising generating a regulated voltage at the second terminal from a voltage at one of the first terminals.

16. The method of claim 15, wherein the circuit is operated in a forward buck mode to generate a regulated voltage at the second terminal from a voltage at one of the first terminals.

17. The method of claim 9, wherein the first terminals of the circuit are input terminals of the circuit, wherein the second terminal of the circuit is an output terminal of the circuit.

18. A circuit comprising:
   a plurality of first terminals;
   a second terminal;
   means for generating a high-side drive signal and a low-side drive signal; and
   means for generating a regulated voltage from a voltage provided to the circuit using the high-side signal and the low-side drive signal, including:
   a low-side switch electrically connected to the second terminal of the circuit and configured to be driven by the low-side drive signal; and
   means for selectively driving two or more high-side switches connected to the two or more first terminals with the high-side drive signal, the two or more high-side switches each forming a half-bridge circuit in relation to the low-side switch.

19. The circuit of claim 18, wherein the means for selectively driving comprises a shorting matrix.

20. The circuit of claim 18, wherein the means for generating a regulated voltage includes a buck mode of operation and a boost mode of operation.

* * * * *